United States Patent
Bhakar et al.

(10) Patent No.: US 10,481,876 B2
(45) Date of Patent: Nov. 19, 2019

(54) METHODS AND SYSTEMS FOR APPLICATION RENDERING

(71) Applicant: Microsoft Technology Licensing, LLC, Redmond, WA (US)

(72) Inventors: Gautam Bhakar, Redmond, WA (US); Mihir S. Ray, Redmond, WA (US); Thomas W. Millett, Mill Creek, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/404,130

(22) Filed: Jan. 11, 2017

(65) Prior Publication Data
US 2018/0196644 A1    Jul. 12, 2018

(51) Int. Cl.
| | |
|---|---|
| *G06F 9/44* | (2018.01) |
| *G06F 8/30* | (2018.01) |
| *G06F 8/41* | (2018.01) |
| *G06F 9/445* | (2018.01) |
| *G06F 8/38* | (2018.01) |
| *G06F 9/451* | (2018.01) |

(52) U.S. Cl.
CPC .............. *G06F 8/31* (2013.01); *G06F 8/443* (2013.01); *G06F 9/44526* (2013.01); *G06F 8/38* (2013.01); *G06F 9/451* (2018.02)

(58) Field of Classification Search
CPC ......... G06F 8/41; G06F 9/46; G06F 2209/541
See application file for complete search history.

(56) References Cited

U.S. PATENT DOCUMENTS

| | | |
|---|---|---|
| 7,228,500 B2 | 6/2007 | Calvert et al. |
| 7,945,849 B2 | 5/2011 | Calvert et al. |
| 7,945,853 B2 | 5/2011 | Kothari et al. |

(Continued)

FOREIGN PATENT DOCUMENTS

| | | |
|---|---|---|
| CN | 1855052 A | 11/2006 |
| CN | 1855053 A | 11/2006 |

(Continued)

OTHER PUBLICATIONS

Livshits, et al., "Doloto: Code Splitting for Network-Bound Web 2.0 Applications", In Technical Report MSR-TR-2007-159, 2007, pp. 1-25.

(Continued)

*Primary Examiner* — Duy Khuong T Nguyen
(74) *Attorney, Agent, or Firm* — Merchant & Gould

(57) ABSTRACT

Rendering an application is provided. An application script file having scripts corresponding to functions of an application may be retrieved. The application script file may be decomposed into a first script file and a second script file. The first script file may be created by removing at least one script corresponding to at least one function determined for deferred rendering from the application script file. The second script file may be created to include the removed at least one script. The first script file may be sent to a user device to be executed to provide an initial render of the application. The second script file then may be transmitted to the user device for execution of the removed at least one script as part of a deferred rendering of the application.

18 Claims, 9 Drawing Sheets

(56) References Cited

U.S. PATENT DOCUMENTS

| | | | |
|---|---|---|---|
| 8,001,469 B2 | 8/2011 | Weng et al. | |
| 8,285,808 B1 | 10/2012 | Joel et al. | |
| 8,639,743 B1 | 1/2014 | Colton et al. | |
| 8,650,426 B2 | 2/2014 | Rychlik et al. | |
| 8,819,649 B2 | 8/2014 | Lafreniere et al. | |
| 8,850,574 B1 | 9/2014 | Ansel et al. | |
| 9,258,136 B2 | 2/2016 | Verschoor et al. | |
| 9,282,145 B2 | 3/2016 | Wei et al. | |
| 9,405,555 B2 | 8/2016 | Livshits et al. | |
| 9,582,599 B2* | 2/2017 | Green | G06F 16/972 |
| 9,626,197 B1* | 4/2017 | Burciu | G06F 3/0485 |
| 2003/0033448 A1 | 2/2003 | Kieffer | |
| 2004/0034814 A1 | 2/2004 | Thompson | |
| 2004/0034831 A1 | 2/2004 | Grober et al. | |
| 2004/0117439 A1* | 6/2004 | Levett | G06F 9/46 |
| | | | 709/203 |
| 2005/0155022 A1 | 7/2005 | Dewitt et al. | |
| 2005/0223359 A1 | 10/2005 | Rao nagaraju et al. | |
| 2006/0015810 A1 | 1/2006 | Calvert et al. | |
| 2007/0016949 A1 | 1/2007 | Dunagan et al. | |
| 2007/0143672 A1* | 6/2007 | Lipton | G06F 17/30899 |
| | | | 715/205 |
| 2008/0222242 A1 | 9/2008 | Weiss et al. | |
| 2008/0235325 A1* | 9/2008 | Calvert | G06F 16/9574 |
| | | | 709/203 |
| 2008/0271046 A1* | 10/2008 | Lipton | G06F 9/44521 |
| | | | 719/311 |
| 2008/0307394 A1* | 12/2008 | Marchant | G06F 9/44521 |
| | | | 717/120 |
| 2009/0031210 A1* | 1/2009 | Backhouse | G06F 16/958 |
| | | | 715/234 |
| 2009/0089797 A1 | 4/2009 | Kukreja et al. | |
| 2009/0129319 A1 | 5/2009 | Buddhikot et al. | |
| 2009/0292791 A1 | 11/2009 | Livshits et al. | |
| 2010/0042979 A1 | 2/2010 | Nanja et al. | |
| 2010/0042981 A1 | 2/2010 | Dreyer et al. | |
| 2011/0214016 A1 | 9/2011 | Gschwind | |
| 2012/0110435 A1 | 5/2012 | Green | |
| 2012/0272132 A1 | 10/2012 | Mondal et al. | |
| 2013/0061128 A1 | 3/2013 | Lucco et al. | |
| 2013/0191439 A1* | 7/2013 | Kern | G06F 9/52 |
| | | | 709/203 |
| 2014/0281918 A1* | 9/2014 | Wei | H04L 67/02 |
| | | | 715/234 |
| 2015/0100879 A1 | 4/2015 | Nandagopal et al. | |
| 2015/0312314 A1 | 10/2015 | Liu et al. | |
| 2018/0046442 A1 | 2/2018 | Lucco et al. | |

FOREIGN PATENT DOCUMENTS

| | | |
|---|---|---|
| CN | 101263482 A | 9/2008 |
| CN | 101495982 A | 7/2009 |
| CN | 101706753 A | 5/2010 |
| JP | 2009211190 A | 9/2009 |
| WO | 2006085314 A2 | 8/2006 |
| WO | 2011087993 A1 | 7/2011 |

OTHER PUBLICATIONS

"Cut Your JavaScript Load Time 90% with Deferred Evaluation", http://blog.sproutcore.com/cut-your-javascript-load-time-90-with-deferred-evaluation/, Published on: Dec. 6, 2011, 3 pages.
Boissiere, Alexandrine, "Efficient Static Assets Pipeline with Webpack", In Proceedings of ACM Applicative, Feb. 25, 2015, 1 pages.
Lee, et al., "Reducing startup latency in web and desktop applications", In Proceedings of 3rd USENIX Windows NT Symposium, Jul. 12, 1999, 11 pages.
Zimmerman, Joe, "Lazy Loading JavaScript With RequireJS", https://www.joezimjs.com/javascript/lazy-loading-javascript-with-requirejs/, Published on: Mar. 13, 2013, 13 pages.
"Find unused code [closed]", http://stackoverflow.com/questions/245963/find-unused-code, Retrieved on: Dec. 1, 2016, 3 pages.
"The Benefits of Multiple CPU Cores in Mobile Devices", Published in White Papers of Nvidia, 2010, 23 Pages.
"The Java HotSpot Performance Engine", An In-Depth Look, Jun. 1, 1999, 8 Pages.
"Office Action Issued in European Patent Application No. 12828251.4", dated Feb. 7, 2018, 4 Pages.
"Partial Supplementary Search Report Issued in European Patent Application No. 12828251.4", dated Jan. 30, 2015, 5 Pages.
"Supplementary Search Report Issued in European Patent Application No. 12828251.4", dated Jun. 11, 2015, 11 Pages.
"Final Office Action Issued in U.S. Appl. No. 13/225,132", dated Feb. 9, 2017, 10 Pages.
"Final Office Action Issued in U.S. Appl. No. 13/225,132", dated Mar. 27, 2013, 14 Pages.
"Final Office Action Issued in U.S. Appl. No. 13/225,132", dated Jul. 27, 2015, 16 Pages.
"Non Final Office Action Issued in U.S. Appl. No. 13/225,132", dated Jul. 28, 2016, 19 Pages.
"Non Final Office Action Issued in U.S. Appl. No. 13/225,132", dated Jan. 14, 2015, 16 Pages.
"Non Final Office Action Issued in U.S. Appl. No. 13/225,132", dated Mar. 9, 2018, 14 Pages.
"Non Final Office Action Issued in U.S. Appl. No. 13/225,132", dated Dec. 7, 2012, 13 Pages.
"First Office Action and Search Report Issued in Chinese Patent Application No. 201210319613.2", dated Feb. 2, 2015, 12 Pages.
"Second Office Action Issued in Chinese Patent Application No. 201210319613.2", dated Aug. 31, 2015, 6 Pages.
"Office Action and Search Report Issued in Chinese Patent Application No. 201510307296.6", dated Aug. 29, 2017, 10 Pages.
Chandrasekaran, et al., "Compilation and Parallelization Techniques with Tool Support to Realize Sequence Alignment Algorithm on FPGA and Multicore", In Proceedings of the Workshop on New Horizons in Compilers, Aug. 10, 2010, 12 Pages.
Giorgio, Maone, "Noscript Features", Retrieved From: https://noscript.net/features, Aug. 12, 2011, 9 Pages.
Ha, et al., "A Concurrent Trace-baed Just-In-Time Compiler for Single-threaded JavaScript", Workshop on Parallel Execution of Sequential Programs on Multi-Core Architectures, Jun. 1, 1999, 8 Pages.
McCollum, et al., "Hyper-Heuristic Approach to Parallel Code Generation", https://www.researchgate.net/publication/228616651_A_Hyper-Heuristic_Approach_to_Parallel_Code_Generation, Aug. 10, 2010, 5 Pages.
Mika, Tuupola, et al., "Lazy Load Plugin for jQuery", Retrieved from: https://plugins.jquery.com/lazyload/, Aug. 29, 2011, 4 Pages.
"International Search Report and Written Opinion Issued in PCT Application No. PCT/US2012/052414", dated Jan. 30, 2013, 11 Pages.
Chinese Notice of Grant in Patent Application 201510307296.6, dated Nov. 7, 2017, 3 pages.
U.S. Appl. No. 13/225,132, Notice of Allowance dated Sep. 21, 2017, 7 pages.
Japanese Notice of Allowance in Application 2014-528481, dated Nov. 1, 2016, 3 pages.
U.S. Appl. No. 13/225,132, Advisory Action dated Jun. 4, 2013, 3 pages.
"International Search Report and Written Opinion Issued in PCT Application No. PCT/US2018/012439", dated Apr. 6, 2018, 13 Pages.
"Non Final Office Action Issued in U.S. Appl. No. 15/799,966" dated Jul. 27, 2018, 14 Pages.
"Final Office Action Issued in U.S. Appl. No. 13/225,132" dated Sep. 19, 2018, 13 Pages.
"Office Action Issued in Korean Patent Application No. 10-2014-7005629", dated Oct. 16, 2018, 10 Pages.
"Non Final Office Action Issued in U.S. Appl. No. 13/225,132", dated Dec. 20, 2018, 16 Pages.
Georges, et al., "Java Performance Evaluation Through Rigorous Replay Compilation", In Proceedings of the 23rd ACM SIGPLAN Conference on Object-Oriented Programming Systems Languages and Applications, Oct. 19, 2008, 18 Pages.

(56) References Cited

OTHER PUBLICATIONS

"Final Office Action Issued in U.S. Appl. No. 15/799,966", dated Feb. 8, 2019. 19 Pages.
"Self-Modifying Code", Retrieved from: https://en.wikipedia.org/wiki/Self-modifying_code, Feb. 20, 2010, 8 pages.
"Notice of Allowance Issued in U.S. Appl. No. 13/225,132", dated Jun. 20, 2019, 10 pages.

* cited by examiner

MOBILE COMPUTING DEVICE

METHODS AND SYSTEMS FOR APPLICATION RENDERING

BACKGROUND

Network-based applications, such as browser-based email programs, interactive mapping services, social networking web sites, etc., typically use a combination of Dynamic HTML, JavaScript, and other Web browser technologies commonly referred to as "AJAX" to push page generation, content manipulation, and other types of execution to the client's browser. A few well known examples of these types applications include GMAIL™, LIVE MAPS™, RED-FIN™, MYSPACE.COM®, NETFLIX®, etc.

Unfortunately, initial application execution must generally wait until a substantial amount of application code has been downloaded. Further, as the sophistication and feature sets of these network-based applications grow, downloading their client-side code is increasingly becoming a bottleneck in both their initial startup time and subsequent application interactions. Given the importance of performance and "instant gratification" demanded by users in the adoption of such applications, maintaining and improving the application responsiveness despite increased code size is of primary concern. Unfortunately, as applications become more complex and feature rich, the shift of application execution from a back-end server to the client often dramatically increases the amount of data that must be downloaded to the client. The result is that perceived responsiveness of the application is degraded.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and device for application rendering. For example, an application renderer, as described herein, may provide various techniques to reduce perceived render time for the application. In general, the application renderer may reduce the perceived render time by providing an initial render of the application and then patching the initial render with deferred applications. For example, a server may receive an application script file containing scripts for an application from an application developer. A script decomposer may decompose the application script file into at least two script files. A first script file may include scripts corresponding to functions which may provide an initial render of the application. A second script file may include scripts corresponding to one or more functions which may be deferred from the initial render. The first script file may be transmitted to a user device. Scripts in the first script file may be executed on the user device to provide the initial render of the application. After providing the initial render of the application, the second script file may be sent to the user device. Scripts in the second script file may be executed to patch the initial render with the functions deferred from the initial render to complete the rendering of the requested application.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
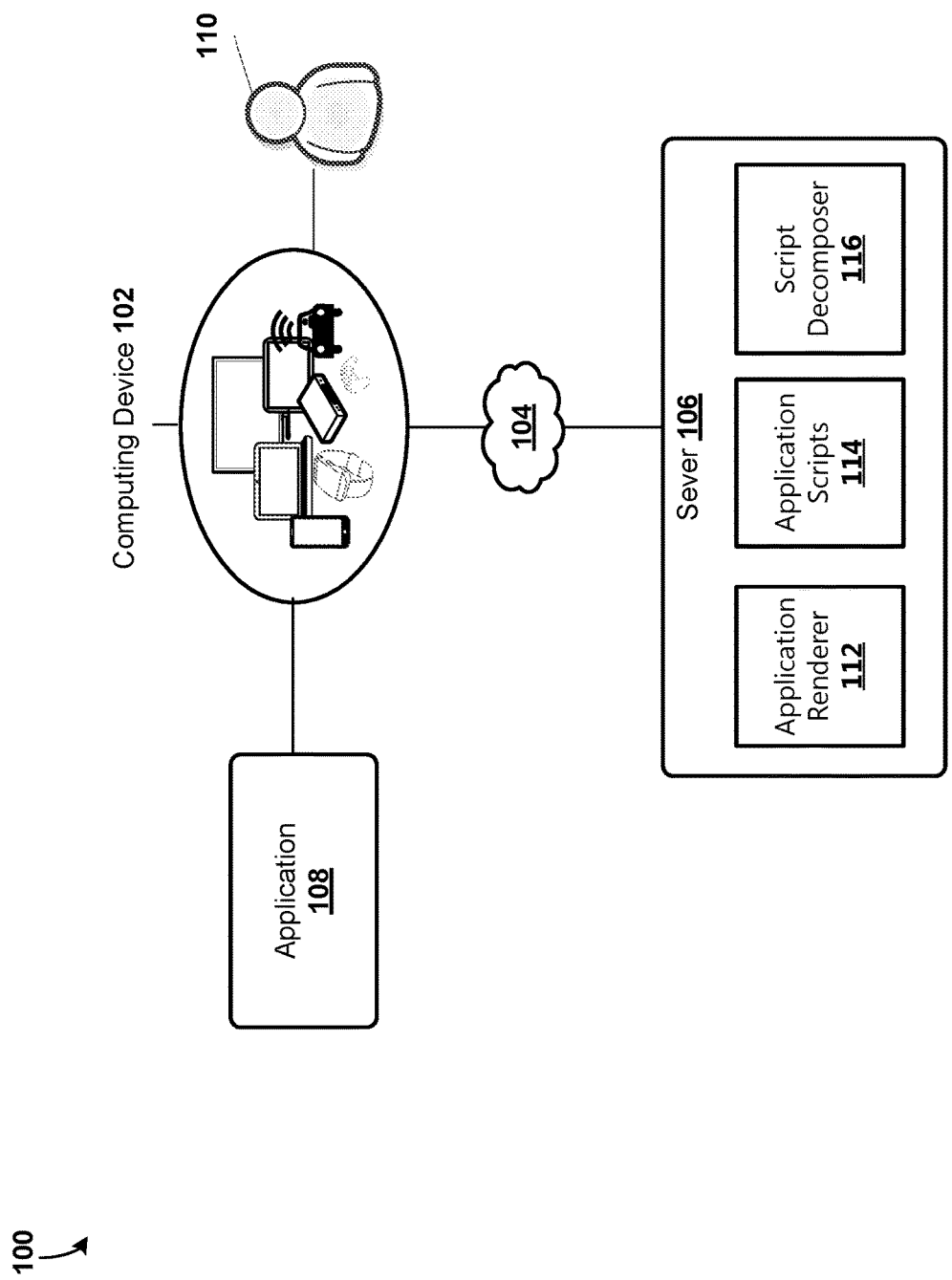
FIG. 1 is a block diagram showing an example operating environment including components of a system for rendering an application.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to methods, systems, and computer storage media for rendering an application and more specifically for rendering a web application. A web application may typically be executed within browser type applications on PC-type computers, handheld devices such as PDA's or mobile telephones or other computing devices such as the device 102 described below with reference to FIG. 1. The present disclosure may provide methods and systems for slimming initial data size for such applications by automatic decomposition of components of such applications into render and non-render components, using a combination of static analysis and lightweight code annotations, and reconstituting the applications at runtime. For example, the present disclosure may provide a two phase approach for slimming the initial data size. Phase one may run during build time (i.e., outside of production) and, using static analysis, may identify a set of functions (and classes) that may not be revocable from application entry points. Scripts corresponding to these identified functions may be removed from a boot script file and placed in an auxiliary script file. The slimmed boot script file (also referred to as a render script file in this disclosure) may be sent first to provide an initial render of the application. Phase two may run shortly after the initial render. In phase two, the auxiliary script file may be sent, and the initial render of the application may be patched on the fly to include the functions in the auxiliary script file.

Advantageously, the two phase approach described in this disclosure may be enabled on existing applications without requiring any application-specific knowledge or any changes to existing code of the application. Further, the application rendering as described herein, may provide an improvement in perceived application load time, particularly pronounced for slower, but increasingly common and important types of connections, such as wireless and mobile connections. In particular, in wireless and mobile connections, the execution penalty (i.e., download size and delay time to initial application execution) is especially high if the entire scripts base must be transferred and executed before application rendering, especially if the user is using a slow connection or a device with lower processing speed.

With reference now to FIG. 1, a block diagram of an example operating environment 100 illustrating aspects of an example system for application rendering is shown. The example operating environment 100 may include an electronic computing device 102. Computing device 102 illustrated in FIG. 1 is illustrated as a tablet computing device; however, as should be appreciated, computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device) for executing applications 108 for performing a variety of tasks. The hardware of these computing devices is discussed in greater detail in regard to FIGS. 6, 7A, 7B, and 8.

A user 110 may utilize computing device 102 to access an application 108. User 110 may utilize application 108 on computing device 102 for a variety of tasks, which may include, for example, to write, calculate, draw, take and organize notes, organize, prepare presentations, send and receive electronic mail, make music, and the like. Examples of suitable applications 108 may include, but are not limited to, electronic mail (Email) applications, interactive mapping service applications social networking applications, word processing applications, spreadsheet applications, slide presentation applications, drawing applications, note-taking applications, web browser applications, and game applications. Application 108 may include thick client applications 108, which are stored locally on the computing device 102, or may include thin client application 108 (i.e., web applications) that reside on a remote server and are accessible over a network. A thin client application 108 may be hosted in a browser-controlled environment or coded in a browser-supported language and may be reliant on a common web browser to render the application 108 executable on the computing device 102.

According to examples, computing device 102 may be operative to communicate with a server 106 over a network 104, such as the Internet or an intranet. Server 106 may include an application renderer 112 and application scripts 114. Application renderer 112, when requested, may be configured to provide application scripts 114 to computing device 102. In one aspect, application renderer 112 may be implemented as an intermediate proxy between server 106 and computing device 102.

Figure 2:
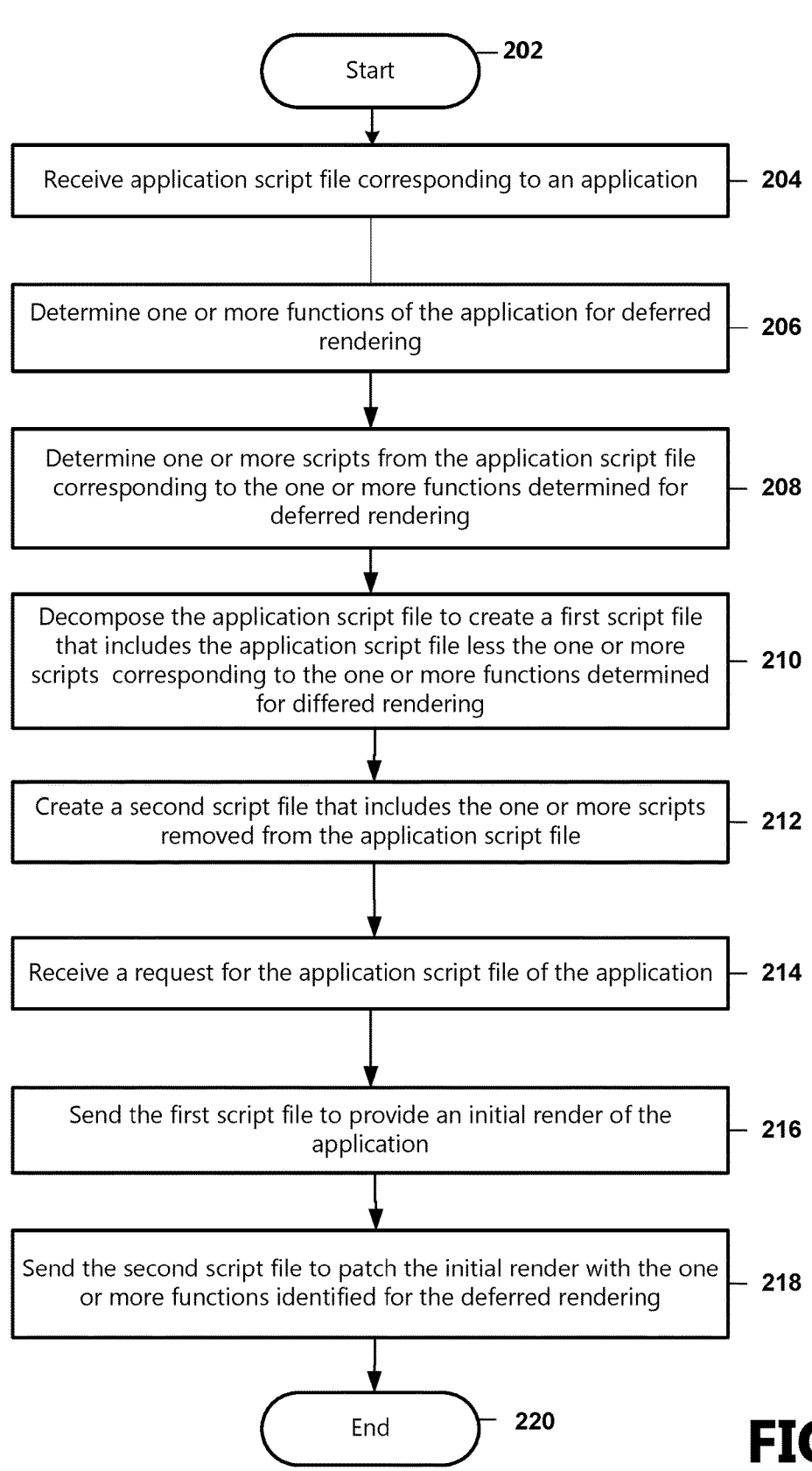
FIG. 2 is a flow chart showing general stages involved in an example method for rendering an application.

Having described an operating environment with respect to FIG. 1, FIG. 2 is a flow chart showing general stages involved in an example method 200 for rendering application 108 on computing device 102. With reference now to FIG. 2, method 200 may begin at start OPERATION 202, and may proceed to OPERATION 204, where an application script file corresponding to an application 108 may be received. For example, a developer may create an application code comprising application scripts 114 for an application and upload the code at server 106. The code may be uploaded as an application script file. Application scripts 114 may include scripts corresponding to components of application 108. For example, application scripts 114 may include scripts which when executed on a user device render components (also referred to as functions in this disclosure) of application 108. The components may include functions, classes, stubs, objects, etc. Application scripts 114 may be contained in an application script file.

Once application scripts 114 are received at OPERATION 204, method 200 may proceed to OPERATION 206 where one or more functions of application 108 may be identified for deferred rendering. For example, script decomposer 116 may, through static analysis and code annotations, identify one or more functions which may be deferred from an initial render of application 108. An example method for identifying one or more functions for deferred rendering is described in detail with respect to FIG. 3.

After identifying the one or more functions for deferred rendering at OPERATION 206, method 200 may proceed to OPERATION 208 where one or more scripts corresponding to one or more functions identified for deferred rendering may be determined. For example, script decomposer 116 may, from the application script file, determine one or more scripts corresponding to the one or more functions deferred from the initial render.

Once the one or more scripts are determined at OPERATION 208, method 200 may proceed to OPERATION 210 where the application script file may be decomposed. For example, the application script file may be decomposed into a first script file and a second script file. In one example aspect, the application script file may be decomposed by removing the one or more scripts identified for deferred rendering from the application script file to the second script file. The first script file may comprise the application script file less the one or more scripts.

After creating the first script file at OPERATION 210, method 200 may proceed to OPERATION 212 where the second script file may be created. For example, the second script file may be created to include the one or more scripts removed from the application script file. In an example aspect, the first script file may also be referred to as a render script file (X.init.js) and the second script file may be referred to as an auxiliary script file (X.defer.js).

Once the application script file has been decomposed into a first file and a second file at OPERATIONS 210 and 212 respectively, method 200 may proceed to OPERATION 214 where a request for accessing application 108 may be received. The request for application 108 may be received in response to user 110 initiating access for application 108. For example, user 110 may initiate the access for application 108 by clicking on an icon representative of application 108 or by providing a web address of application 108. Upon initiation, computing device 102 may communicate with server 106 requesting components of application 108.

After receiving the request for application 108 at OPERATION 214, method 200 may proceed to OPERATION 216 where the first script file may be sent to computing device 102. The first script file may be sent first to provide the initial render for application 108. For example, the first script file may be received and executed by computing device 102 to provide the initial render of application 108.

Once the initial render of application 108 is provided at OPERATION 216, method 200 may proceed to OPERATION 218 where the second script file may be sent to computing device 102. The second script file may be received and executed by computing device 102 to patch the initial render with the one or more functions identified as the deferred rendering to provide a complete render of application 108. After providing the complete render of application 108 at OPERATION 218, method 200 may end at OPERATION 220.

In one aspect, there may be several different ways for decomposing the application script file into the render script file and the auxiliary script file. For example, functions of application 108 may be classified as one of a removable function, a no-op stub function, and a queued stub function. The application script file may then be decomposed into the render script file (X.init.js) and the auxiliary scripts file (X.defer.js) based on the function classifications.

For example, if a function is guaranteed not to be called during the initial render of application 108, then a script corresponding to that function may be left out of the boot script file, and moved to the auxiliary script file. In a hypothetical, if Foo is a class with functions Bar and Baz, the boot script file (X.js) may be provided as:

```
// constructor
Foo = function( ) {
}
Foo.prototype = {
 Bar: function( ) {
  // Bar implementation
 },
 Baz: function( ) {
  // Baz implementation
 }
}
```

Further if, in the hypothetical, function Bar is never called during the initial render of application 108, then the render script file (X.init.js) may be generated as:

```
// constructor
Foo = function( ) {
}
Foo.prototype = {
 Baz: function( ) {
  // Baz implementation
 }
}
```

In the same hypothetical, the auxiliary script file (X.defer.js) may be generated as:

```
Foo.prototype.Bar = function( ) {
 // Bar implementation
}
```

Continuing with the previous hypothetical, if function Bar is technically invokable, but may not need to be invoked (i.e. its effects/results may not be required) during the initial rendering, and there is no harm in it simply not running, the function Bar may be classified as a no-op stub function. An example of the no-op stub function may include a diagnostic function and a logging function. A no-op stub function may not be removed from the initial render as it may be called by other functions, and removing it may lead to a runtime error. However, a no-op stub function may not be required or used by user 110 in the initial render of application 108. Hence, for a no-op stub function, the render scripts file (X.init.js) may be defined as:

```
// constructor
Foo = function( ) {
}
Foo.prototype = {
 Bar: Defer.StubNoOp("Foo.prototype.Bar"),
 Baz: function( ) {
  // Baz implementation
 }
}
```

The auxiliary scripts file (X.defer.js) for a no-op stub function may be defined as:

```
Foo.prototype.Bar = function( ) {
 // Bar implementation
}
```

In the previous implementation, Defer.StubNoOp("Foo.prototype.Bar") may be a factory method that may construct a unique definition of the no-op stub function. For example, the no-op stub may be a function definition that may check whether a declaration in the render script file (X.defer.js) has executed (i.e., the X.defer.js has successfully downloaded and been interpreted). If a declaration in the render script file (X.defer.js) has executed, then the function declared in the auxiliary script file (X.defer.js) may be invoked on behalf of a calling function and its results returned. If the auxiliary script file has not been executed, a call for the no-op stub function may simply return without doing anything.

A function which may be invoked during the initial render, and a call to such function may not be ignored as in the no-op stub function, but results of the call may not be immediately required, may be classified as a queued stub function. An example of the queued stub function may include a network bound operation, where a calling function by definition may not know when the called function will run, only that it will run at some point asynchronously with respect to the current execution. For the queued stub function, the boot script file (X.init.js) may be defined as:

```
// constructor
Foo = function( ) {
}
Foo.prototype = {
 Bar: Defer.StubQueue("Foo.prototype.Bar"),
 Baz: function( ) {
  // Baz implementation
 }
}
```

The auxiliary script file (X.defer.js) for the queued stub functions may be defined as:

```
Foo.prototype.Bar = function( ) {
  // Bar implementation
}
```

The decomposition for the queued stub functions may be similar to those of the no-op stub functions, but instead of ignoring the call if a new definition has not arrived, all the arguments and context to the queued stub functions may be packaged and saved in a data structure. Later, when an actual definition of the queued stub function arrives, the stored contexts may be examined, and may be used to invoke a real definition of the queued stub function.

In example aspects, there may be several ways to classify functions of application 108 as removable, a no-op stub, and as a queued stub function. For example, a code developer for application 108 may explicitly annotate functions that are removable, no-op stub, or queued stub. As an example, a function to handle a button click may be annotated as either a queued stub function or a no-op function. The function to handle the button click may be deferred from the initial render as application 108 may not respond to a user's button click. Moreover, any function that is only invoked from a deferred annotated function may also be classified as a deferred function because by definition, it cannot be invoked.

Figure 3:
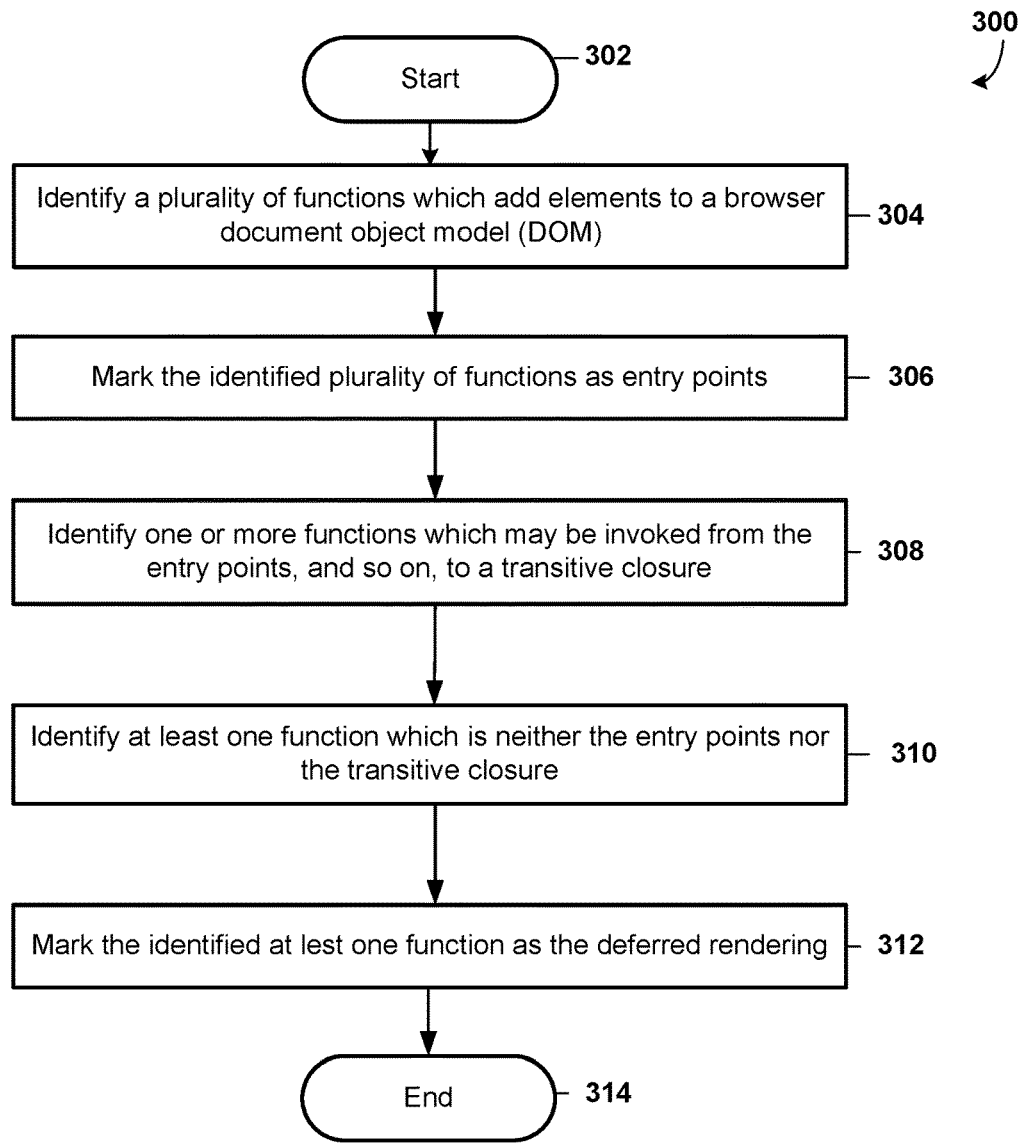
FIG. 3 is a flow chart showing general stages involved in determining one or more functions for deferred rendering.

In example aspects, functions may be determined as deferred functions based on static analysis of functions of application 108 and dependency generation of the functions. An example implementation of automatic detection of deferred functions is illustrated in FIG. 3. For example, FIG. 3 is a flow diagram showing general stages involved in an example method 300 of determining functions of application 108 which may be deferred from the initial render. With reference now to FIG. 3, method 300 may begin at start OPERATION 302, and proceed to OPERATION 304, where functions which add elements to the initial render of application 108 may be identified. For example, a complex single page web application may typically be rendered by executing application scripts that add elements to a browser document object model (DOM).

Having identified functions which add elements to the browser DOM at OPERATION 304, method 300 may proceed to OPERATION 306 where the identified elements may be marked as entry points. For example, functions invoked by a main page of the browser DOM for the purposes of rendering may be collectively referred to as the entry points of application 108. As an example, often the entry points may simply be one function called Program.Main( ) or Program.Render( ). In an example aspect, functions that may be invoked by user interaction with the browser DOM elements may also be added to the list of entry points.

Once, the entry points have been marked at OPERATION 306, method 300 may proceed to OPERATION 308 where functions which may be invoked from the entry points may be identified. In one aspect, the list of entry points may be expanded to include functions which may be invoked from the entry points, and all functions which may be invoked from those invoked functions until a transitive closure of all functions that may possibly be invoked at part of the initial render.

Having identified the transitive closure at OPERATION 308, method 300 may proceed to OPERATION 310 where functions that are neither entry points nor in the transitive closure may be identified. At OPERATION 312, the functions identified at OPERATION 310, of method 300, may be marked as deferred rendering for the initial render. Having marked functions for deferred rendering at OPERATION 312, method 300 may end at OPERATION 314.

In one aspect, the deferred functions may include constructor functions which may indicate that an entire associated class may be deferred from the initial render. In another aspect, previously declared classes may be modified as to include previously deferred functions. However, there may be one or more constraints on class declarations for the mechanism to work. In addition, all the deferrable functions must be removed/replaced on a canonical prototype object of their class.

Figure 4:
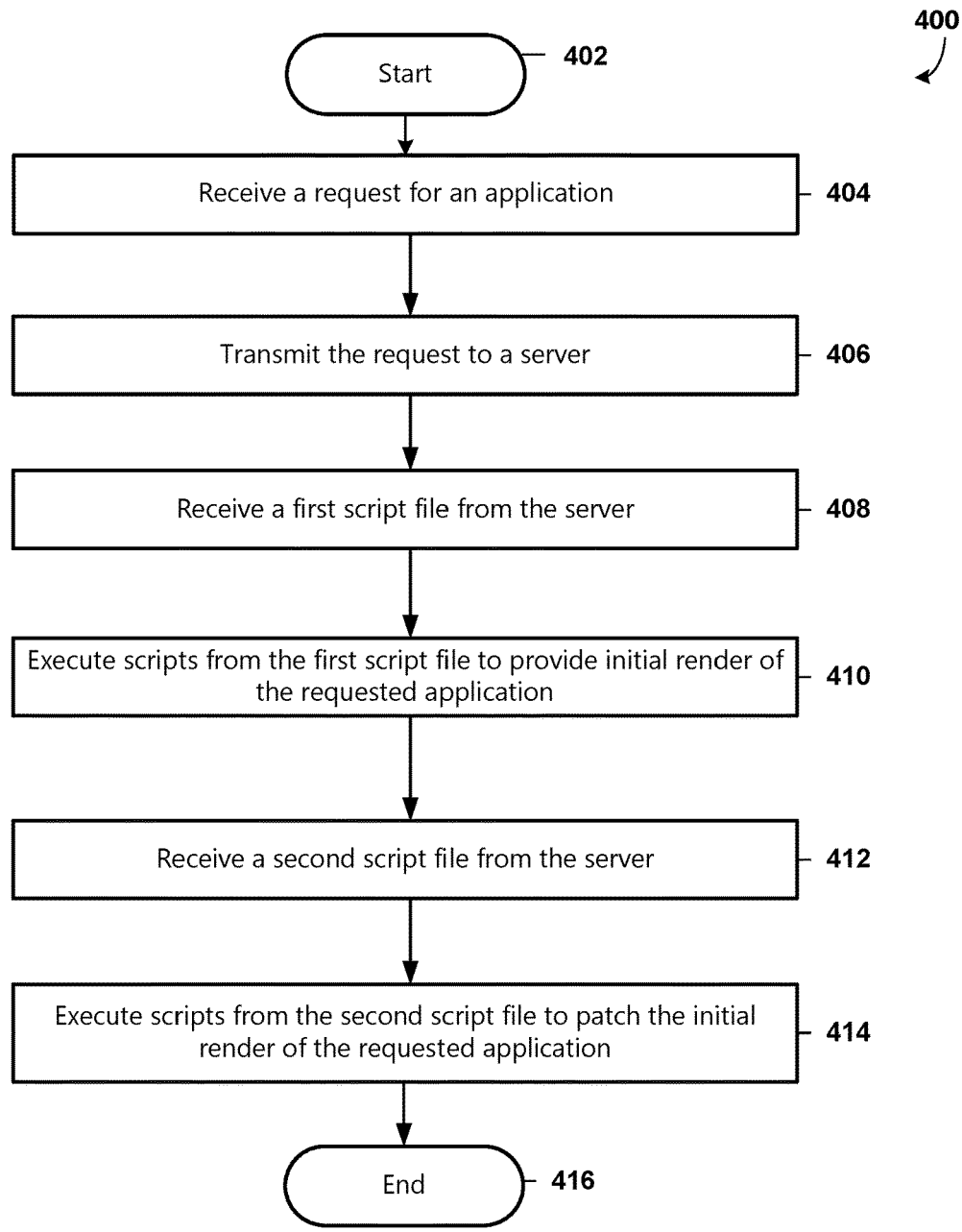
FIG. 4 is a flow chart showing general stages involved in another example method for rendering an application.

FIG. 4 a flow diagram showing general stages involved in an example method 400 for providing application 108 on computing device 102. For example, method 400 may begin at start OPERATION 402, and proceed to OPERATION 404, where a request for an application may be received. For example, computing device 102 may receive a request from user 110 to access application 108. After receiving the request for application 108 at OPERATION 404, method 400 may proceed to OPERATION 406 where the received request may be forwarded to a server hosting the request application. For example, the received request for application 108 may be forwarded to server 106.

After transmitting the request to server 106 at OPERATION 406, method 400 may proceed to OPERATION 408 where a first script file may be received. For example, a first script file may be received from server 106 in response to the request for application 108. The received first file may be a render script file and may include scripts to be executed at computing device 102. After receiving the first script file at OPERATION 408, method 400 may proceed to OPERATION 410 where scripts received in the first file may be executed to provide an initial render of application 108.

Once the initial render of application 108 is provided at OPERATION 410, method 400 may proceed to OPERATION 412 where a second script file may be received. For example, after providing the initial render of application 108, computing device 102 may receive the second script file. The second script file may be an auxiliary script file and may include deferred scripts from the first script file. In another aspect, the second script file may be received after download of the first script file while boot scripts from the first script file are being executed to provide the initial render.

After receiving the second script file at OPERATION 412, method 400 may proceed to OPERATION 414 where scripts from the second script file may be executed. For example, scripts from the second script file may be executed to patch the initial render of application 108 to provide a complete render. In one aspect, the initial render may be patched on the fly. Once the initial render of application 108 is patched at OPERATION 414, method 400 may end at OPERATION 416.

Figure 5:
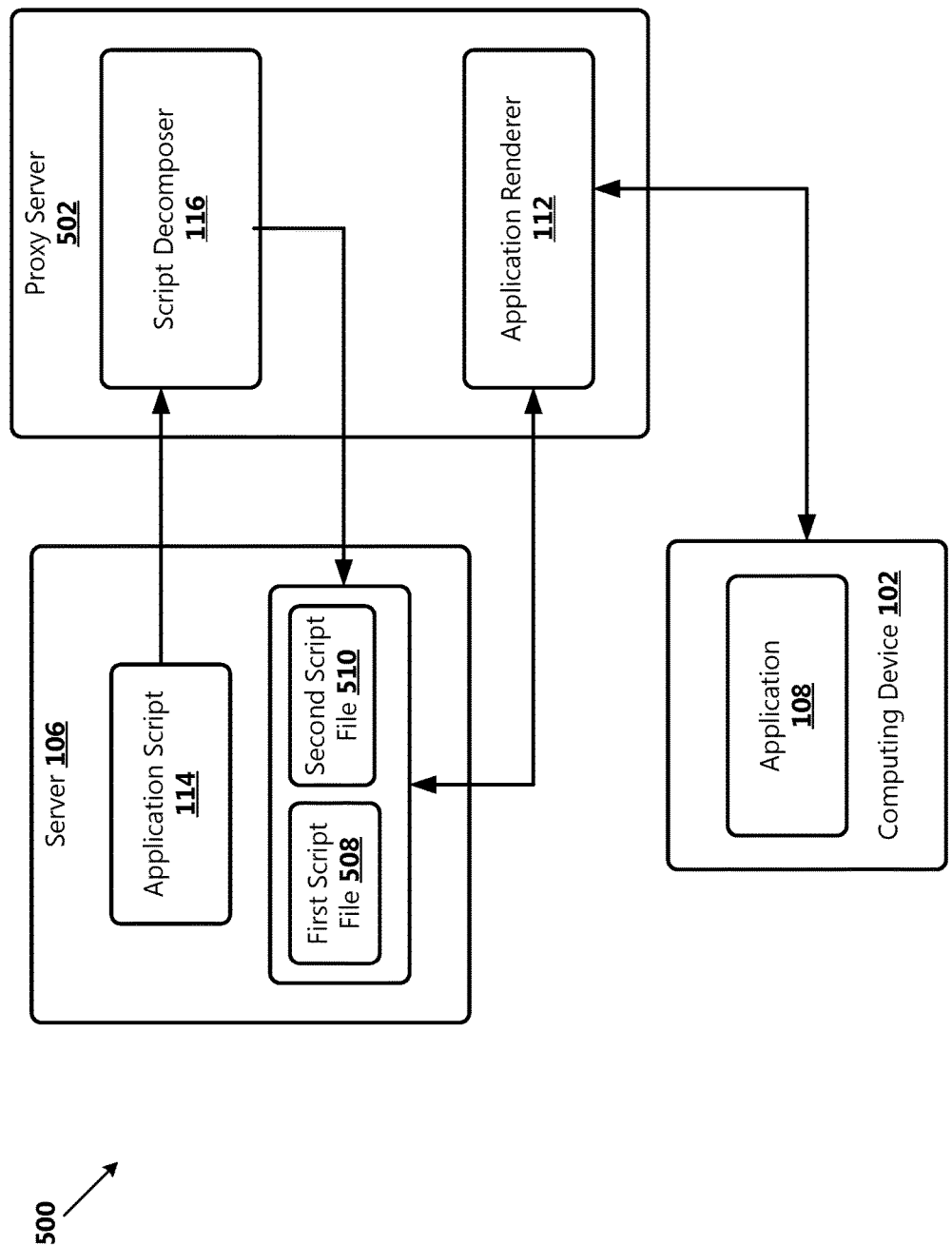
FIG. 5 is a block diagram showing an application renderer acting as an intermediary between a client and a server for purposes of rendering an application.

In one example aspect, application renderer 112 and script decomposer 116 may be located away from server 106. For example, application renderer 112 and script decomposer 116 may be located on a proxy server. In another example aspect, application renderer 112 and script decomposer 116 may be located on two separate proxy servers. FIG. 5 provides an exemplary architectural flow diagram 500 that illustrates application renderer 112 and script decomposer 116 being located on a proxy server 502. The example architectural flow diagram 500 illustrates application renderer 112 acting as an intermediary between computing device 102 and server 106 for the purposes of rendering applications on computing device 102. In one aspect, application renderer 112 may implemented as an intermediary proxy bet server 106 and computing device 102 such that application renderer 112 may intercept all calls from computing device 102 and forward them to server 106. In addition, application renderer 112 may intercept all responses from server 106 directed to computing device 102 and reply to computing device 102 as if it were server 106.

For example, and as shown in FIG. 5, application scripts 114 corresponding to application 108 may be uploaded on server 106. Script decomposer 116 may analyze functions of application 108 to determine at least one function for deferred rendering. Script decomposer 116, based on the analysis, may decompose an application script file containing application scripts 114 into a first script file 508 and a second script file 510.

Application renderer 112 may intercept a request for application 108 from computing device 102. Application renderer 112 may forward intercepted request to server 106. Application renderer 112, in response to the request for application 108, may receive the decomposed first script file 508 and second script file 510 from server 106. Application renderer 112 may then send first script file 508 to computing device 102. Computing device 102 may execute scripts from first script file 508 to provide initial render of application 108. Application renderer 112 then may send second script file 510 to computing device 102 to patch the initial render and include functions deferred from the initial render.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
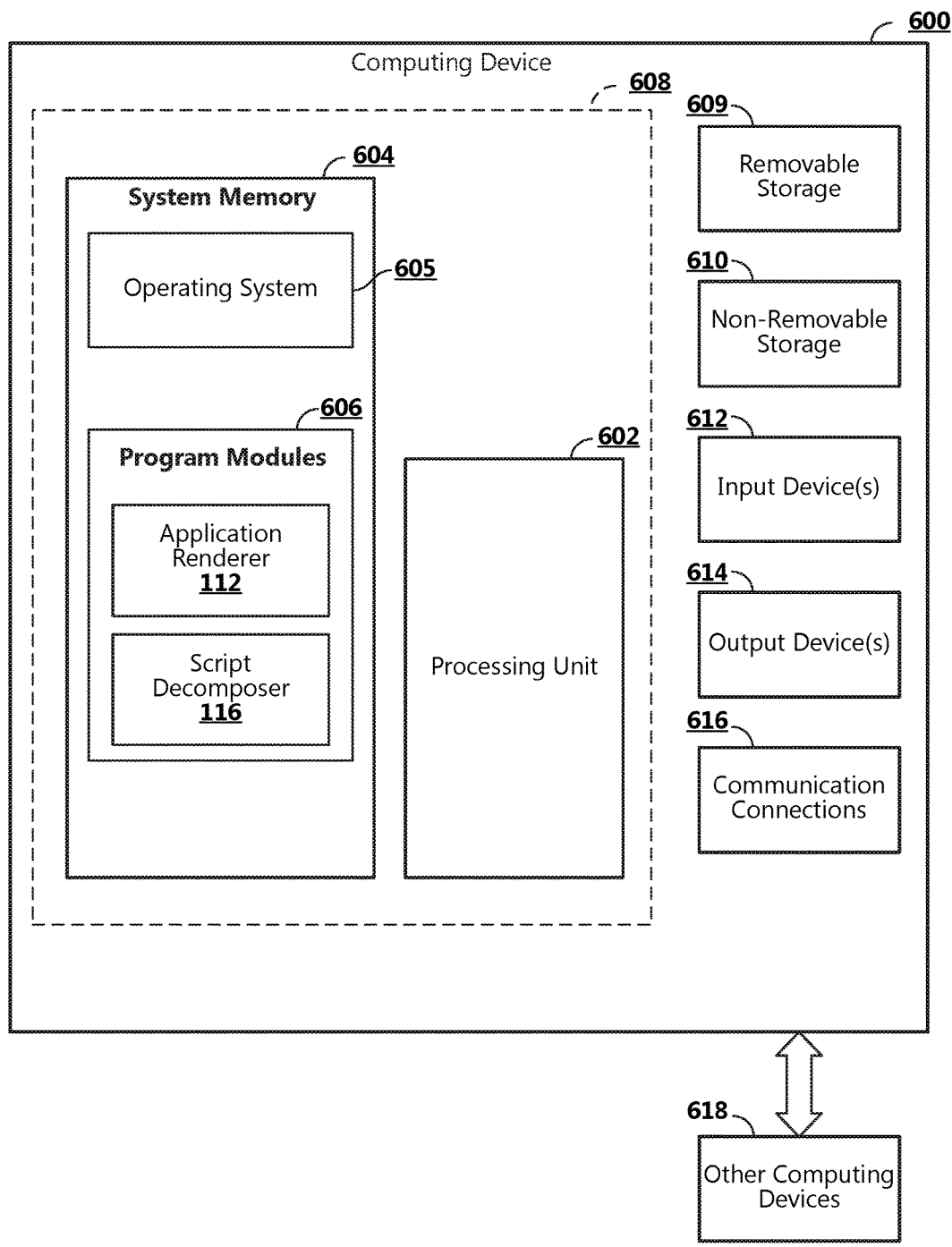
FIG. 6 is a block diagram illustrating example physical components of a computing device.
Figure 7A:
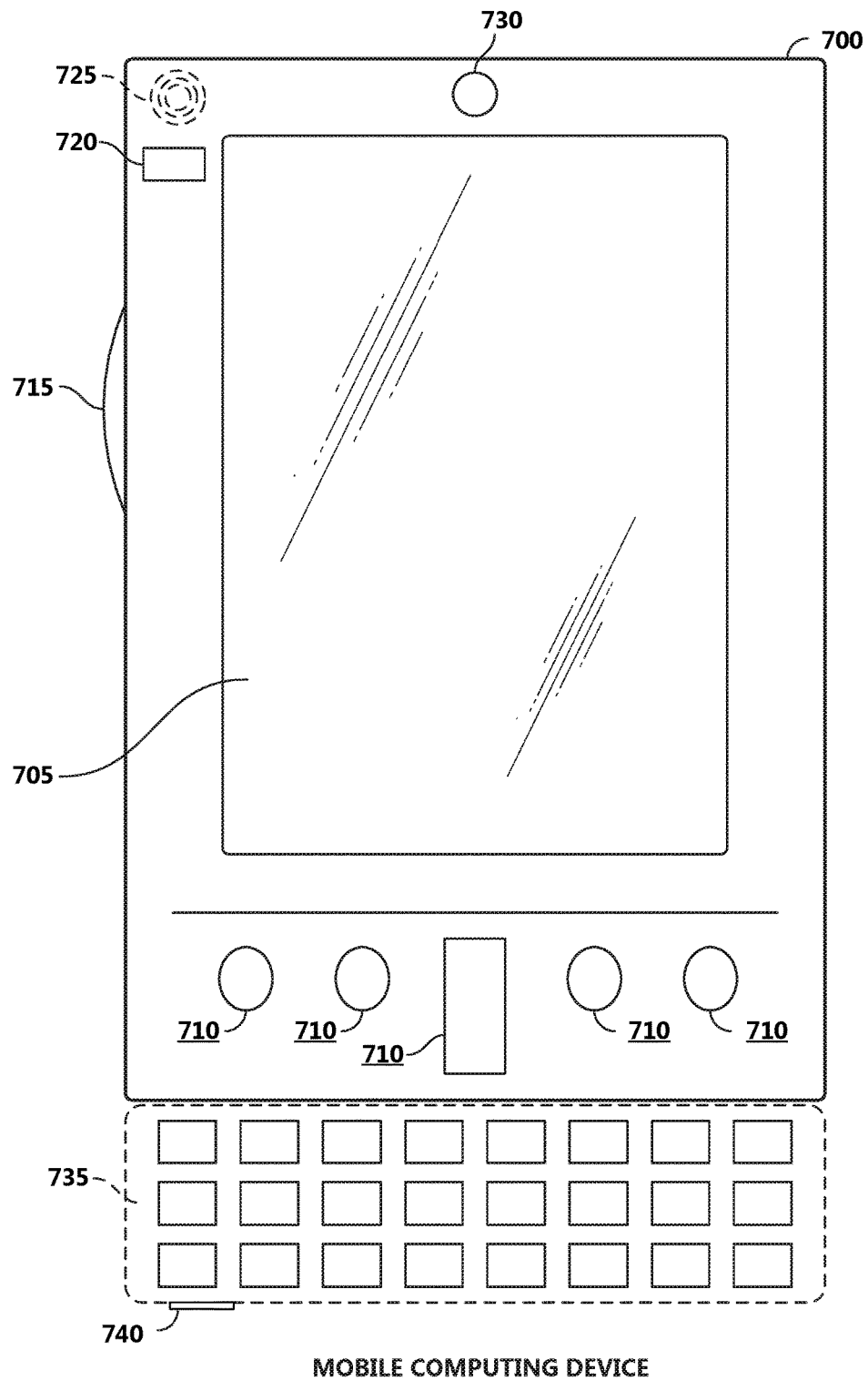
FIGS. 7A and 7B are simplified block diagrams of a mobile computing device.
Figure 7B:
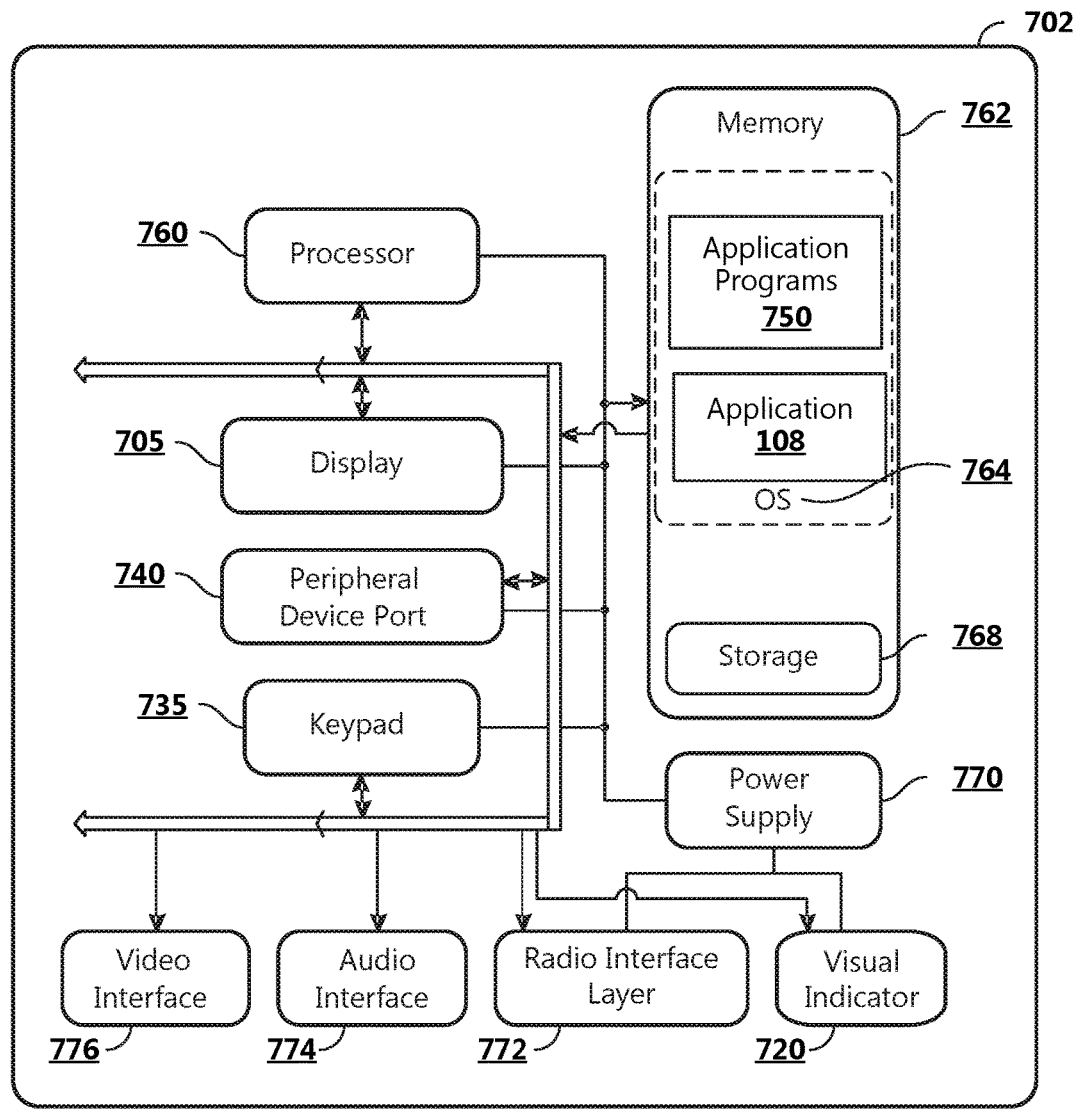
Figure 8:
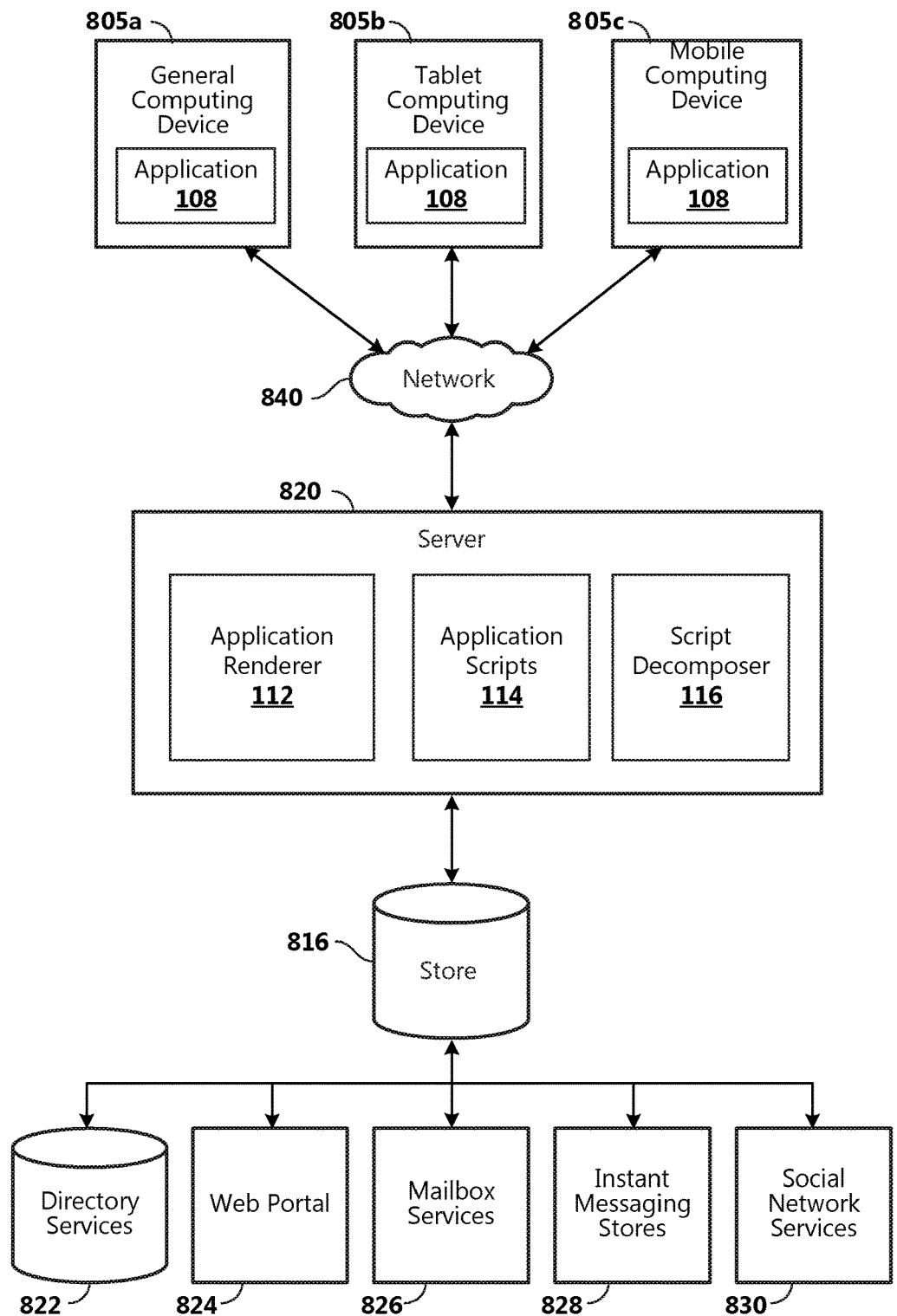
FIG. 8 is a simplified block diagram of a distributed computing system.

FIGS. 6-8 and the associated descriptions provide a discussion of a variety of operating environments in which examples are practiced. However, the devices and systems illustrated and discussed with respect to FIGS. 6-8 are for purposes of example and illustration and are not limiting of a vast number of computing device configurations that are utilized for practicing aspects, described herein.

FIG. 6 is a block diagram illustrating physical components (i.e., hardware) of a computing device 600 with which examples of the present disclosure may be practiced. In a basic configuration, computing device 600 may include at least one processing unit 602 and a system memory 604. According to an aspect, depending on the configuration and type of computing device, system memory 604 may include, but is not limited to, volatile storage (e.g., random access memory), non-volatile storage (e.g., read-only memory), flash memory, or any combination of such memories. According to an aspect, system memory 604 may include an operating system 605 and one or more program modules 606 suitable for running software applications 650. According to an aspect, system memory 604 includes application renderer 112 and script decomposer 116. An operating system 605, for example, may be suitable for controlling the operation of the computing device 600. Furthermore, aspects may be practiced in conjunction with a graphics library, other operating systems, or any other application program and may not limited to any particular application or system. This basic configuration is illustrated in FIG. 6 by those components within a dashed line 608. According to an aspect, computing device 600 may include additional features or functionality. For example, according to an aspect, computing device 600 may include additional data storage devices (removable and/or non-removable) such as, for example, magnetic disks, optical disks, or tape. Such additional storage is illustrated in FIG. 6 by a removable storage device 609 and a non-removable storage device 610.

As stated above, according to an aspect, a number of program modules and data files are stored in system memory 604. While executing on the processing unit 602, program modules 606 (e.g., application renderer 112) may perform processes including, but not limited to, one or more of the stages of the methods 200-400 illustrated in FIGS. 2-4 respectively. According to an aspect, other program modules may be used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 6 are integrated onto a single integrated circuit. According to an aspect, such an SOC device may include one or more processing units, graphics units, communications units, system virtualization units and various application functionality all of which may be integrated (or "burned") onto the chip substrate as a single integrated circuit. When operating via an SOC, the functionality, described herein, may be operated via application-specific logic integrated with other components of the computing device 600 on the single integrated circuit (chip). According to an aspect, aspects of the present disclosure may be practiced using other technologies capable of performing logical operations such as, for example, AND, OR, and NOT, including but not limited to mechanical, optical, fluidic, and quantum technologies. In addition, aspects may be practiced within a general purpose computer or in any other circuits or systems.

According to an aspect, computing device 600 may have one or more input device(s) 612 such as a keyboard, a mouse, a pen, a sound input device, a touch input device, etc. Output device(s) 614 such as a display, speakers, a printer, etc. may also be included according to an aspect. The aforementioned devices are examples and others may be used. According to an aspect, computing device 600 may include one or more communication connections 616 allowing communications with other computing devices 618. Examples of suitable communication connections 616 may include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. System memory 604, removable storage device 609, and non-removable storage device 610 may all be computer storage media examples (i.e., memory storage.) According to an aspect, computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which may be used to store information and which may be accessed by computing device 600. According to an aspect, any such computer storage media is part of computing device 600. Computer storage media does not include a carrier wave or other propagated data signal.

According to an aspect, communication media may be embodied by computer readable instructions, data structures, program modules, or other data in a modulated data signal, such as a carrier wave or other transport mechanism, and includes any information delivery media. According to an aspect, the term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which aspects may be practiced. With reference to FIG. 7A, an example of a mobile computing device 700 for implementing the aspects is illustrated. In a basic configuration, mobile computing device 700 may be a handheld computer having both input elements and output elements. Mobile computing device 700 may typically include a display 705 and one or more input buttons 710 that allow the user to enter information into mobile computing device 700. According to an aspect, display 705 of mobile computing device 700 may function as an input device (e.g., a touch screen display). If included, an optional side input element 715 may allow further user input. According to an aspect, side input element 715 may be a rotary switch, a button, or any other type of manual input element. In alternative examples, mobile computing device 700 may incorporate more or less input elements. For example, display 705 may not be a touch screen in some examples. In alternative examples, mobile computing device 700 may be a portable phone system, such as a cellular phone. According to an aspect, mobile computing device 700 may include an optional keypad 735. According to an aspect, optional keypad 735 may be a physical keypad. According to another aspect, optional keypad 735 may be a "soft" keypad generated on the touch screen display. In various aspects, the output elements may include display 705 for showing a graphical user interface (GUI), a visual indicator 720 (e.g., a light emitting diode), and/or an audio transducer 725 (e.g., a speaker). In some examples, mobile computing device 700 may incorporate a vibration transducer for providing the user with tactile feedback. In yet another example, mobile computing device 700 may incorporate input and/or output ports, such as an audio input (e.g., a microphone jack), an audio output (e.g., a headphone jack), and a video output (e.g., a HDMI port) for sending signals to or receiving signals from an external device. In yet another example, mobile computing device 700 may incorporate peripheral device port 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, mobile computing device 700 may incorporate a system (i.e., an architecture) 702 to implement some examples. In one example, system 702 may be implemented as a "smart phone" capable of running one or more applications (e.g., browser, e-mail, calendaring, contact managers, messaging clients, games, and media clients/players). In some examples, system 702 may be integrated as a computing device, such as an integrated personal digital assistant (PDA) and wireless phone.

According to an aspect, one or more application programs 750 may be loaded into memory 762 and run on or in association with operating system 764. Examples of the application programs may include phone dialer programs, e-mail programs, personal information management (PIM) programs, word processing programs, spreadsheet programs, Internet browser programs, messaging programs, and so forth. According to an aspect, application 108 or application renderer 112 may be loaded into memory 762. System 702 may also include a non-volatile storage area 768 within memory 762. Non-volatile storage area 768 may be used to store persistent information that should not be lost if system 702 is powered down. Application programs 750 may use and store information in the non-volatile storage area 768, such as e-mail or other messages used by an e-mail application, and the like. A synchronization application (not shown) may also reside on system 702 and may be programmed to interact with a corresponding synchronization application resident on a host computer to keep the information stored in non-volatile storage area 768 synchronized with corresponding information stored at the host computer. As should be appreciated, other applications may be loaded into memory 762 and run on mobile computing device 700.

According to an aspect, system 702 may have a power supply 770, which may be implemented as one or more batteries. According to an aspect, power supply 770 may further include an external power source, such as an AC adapter or a powered docking cradle that supplements or recharges the batteries.

According to an aspect, system 702 may include a radio 772 that may perform the function of transmitting and receiving radio frequency communications. Radio 772 may facilitate wireless connectivity between system 702 and the "outside world," via a communications carrier or service provider. Transmissions to and from radio 772 may be conducted under control of operating system 764. In other words, communications received by radio 772 may be disseminated to application programs 750 via operating system 764, and vice versa.

According to an aspect, visual indicator 720 may be used to provide visual notifications and/or an audio interface 774 may be used for producing audible notifications via audio transducer 725. In the illustrated example, visual indicator 720 may be a light emitting diode (LED) and audio transducer 725 may be a speaker. These devices may be directly coupled to power supply 770 so that when activated, they may remain on for a duration dictated by the notification mechanism even though processor 760 and other components might shut down for conserving battery power. The LED may be programmed to remain on indefinitely until the user takes action to indicate the powered-on status of the device. Audio interface 774 may be used to provide audible signals to and receive audible signals from the user. For example, in addition to being coupled to audio transducer 725, audio interface 774 may also be coupled to a microphone to receive audible input, such as to facilitate a telephone conversation. According to an aspect, system 702 may further include a video interface 776 that enables an operation of an on-board camera 730 to record still images, video stream, and the like.

According to an aspect, a mobile computing device 700 implementing system 702 may include additional features or functionality. For example, mobile computing device 700 may include additional data storage devices (removable and/or non-removable) such as, magnetic disks, optical disks, or tape. Such additional storage is illustrated in FIG. 7B by the non-volatile storage area 768.

According to an aspect, data/information generated or captured by mobile computing device 700 and stored via system 702 may be stored locally on mobile computing device 700, as described above. According to another aspect, the data may be stored on any number of storage media that may be accessible by the device via radio 772 or via a wired connection between mobile computing device 700 and a separate computing device associated with mobile computing device 700, for example, a server computer in a distributed computing network, such as the Internet. As should be appreciated such data/information may be accessible via mobile computing device 700 via radio 772 or via a distributed computing network. Similarly, according to an aspect, such data/information may readily be transferred between computing devices for storage and use according to well-known data/information transfer and storage means, including electronic mail and collaborative data/information sharing systems.

FIG. 8 illustrates one example of the architecture of a system for rendering applications as described above. Content developed, interacted with, or edited in association with the application 108, application renderer 112, application scripts 114, or script decomposer 116, may be enabled to be stored in different communication channels or other storage types. For example, various documents may be stored using a directory service 822, a web portal 824, a mailbox service 826, an instant messaging store 828, or a social networking site 830. Application 108 may be operative to use any of these types of systems or the like for providing application 108 as described herein. According to an aspect, a server 820 may provide application 108 to clients 805a,b,c. As one example, the server 820 may be a web server providing application 108 over the web. Server 820 may provide application 108 over web to clients 805 through a network 840. By way of example, the client computing device may be implemented and embodied in a personal computer 805a, a tablet computing device 805b or a mobile computing device 805c (e.g., a smart phone), or other computing device. Any of these examples of the client computing device may be operable to obtain content from store 816.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for rendering an application, comprising:
retrieving an application script file comprising a plurality of scripts corresponding to a plurality of functions of an application, wherein the application is a web application;
decomposing the application script file into a first script file and a second script file, wherein decomposing the application script file comprises:
determining at least one function of the plurality of functions for deferred rendering;
creating the first script file by removing, from the application script file, at least one script corresponding to the determined at least one function for deferred rendering; and
creating the second script file comprising the removed at least one script;
executing scripts in the first script file to provide an initial render of the application; and
executing the removed at least one script in the second script file to patch on the fly the initial render of the application and to include the at least one function deferred from the initial render.

2. The method of claim 1, wherein the removed at least one script in the second script file is executed after the initial render of the application is provided, and wherein the initial render is patched during the execution of the at least one script to include the removed at least one function determined for the deferred rendering.

3. The method of claim 1, wherein decomposing the application script file into the first script file and the second script file comprises:

performing static analysis of the plurality of functions to identify the at least one function for the deferred rendering;

removing the at least one script corresponding to the identified at least one function from the application script file to create the first script file; and creating the second script file to include the at least one script removed from the application script file.

4. The method of claim 1, wherein creating the first script file by removing the at least one script from the application script file comprises:

determining a first plurality of functions to be invoked by a main page of the application; and removing the at least one script not corresponding to the determined first plurality of functions to be invoked by a main page of the application.

5. The method of claim 1, wherein creating the first script file by removing the at least one script from the application script file comprises:

determining the at least one function not to be invoked by a main page of the application;

determining the at least one script corresponding to the at least one function; and removing the determined at least one script from the application script file.

6. The method of claim 1, wherein the application is rendered as a hypertext markup language (HTML) document.

7. The method of claim 1, wherein removing the at least one script from the application script file comprises removing the at least one script corresponding to at least one function annotated for the deferred rendering of the application.

8. The method of claim 1, further comprising determining the at least one function for the deferred rendering, wherein determining the at least one function for the deferred rendering comprises:

determining one or more entry points of the application;

determining a first set of functions invokable from the one or more entry points;

determining a second set of functions invokable from the first set of functions to a transitive closure; and determining the first set of functions and the second set of functions as the at least one function for the deferred rendering.

9. A system comprising a computing device for providing an application, the computing device comprising:

at least one processing device; and at least one computer readable data storage device storing instructions that, when executed by the at least one processing device, cause the computing device to:

retrieve an application script file comprising a plurality of scripts corresponding to a plurality of functions of a network application, wherein the network application is a web application;

decompose the application script file into a first script file and a second script file, wherein the at least one processing device configured to decompose the application script file comprises the at least one processing device configured to:

determine at least one function of the plurality of functions for deferred rendering;

create the first script file by removing, from the application script file, at least one script corresponding to the determined at least one function for deferred rendering; and create the second script file comprising the removed at least one script;

transmit the first script file to the user device, wherein the first script file is executed to provide an initial render of the network application; and transmit the second script file to the user device, wherein the removed at least one script in the second script file is executed to patch on the fly the initial render of the network application and to include the at least one function deferred from the initial render.

10. The system of claim 9, wherein the at least one script in the second script file is executed after providing the initial render of the network application.

11. The system of claim 9, wherein the plurality of functions includes components of the network application.

12. The system of claim 9, wherein the network application is an electronic mail application.

13. The system of claim 9, wherein the application script file is a JavaScript file.

14. The system of claim 9, wherein the at least one function is annotated for the deferred rendering from the initial render of the network application.

15. A computer readable storage device including computer readable instructions, which when executed by a processing unit are operative for providing an application, comprising:

retrieving an application script file comprising a plurality of scripts corresponding to a plurality of components of an application, wherein the application is a web application;

decomposing the application script file into a first script file and a second script file, wherein decomposing the application script file comprises:

determining at least one component of the plurality of components for deferred rendering;

creating the first script file by removing, from the application script file, at least one script corresponding to the determined at least one component for deferred rendering; and creating the second script file comprising the removed at least one script;

transmitting the first script file to the user device, wherein scripts in the first script file are executed to provide an initial render of the application; and transmitting the second script file to the user device for execution on the user device to patch on the fly the initial render of the application and to include the at least one component deferred from the initial render.

16. The computer readable storage device of claim 15, further comprising identifying the at least one component of the application for the deferred rendering based on static analysis of the plurality of components.

17. The computer readable storage device of claim 15, further comprising identifying the at least one component for the deferred rendering, wherein identifying the at least one component for the deferred rendering comprises:

determining one or more entry points of the application;

determining a first set of components invokable from the one or more entry points;

determining a second set of components invokable from the first set of components to a transitive closure; and determining the at least one components of the plurality of components for the deferred rendering which are not the first set of components or the second set of components.

18. The computer readable storage device of claim 15, wherein identifying the at least one component for the deferred rendering comprises identifying at least one component annotated for the deferred rendering of the application.

\* \* \* \* \*